Figure 1:
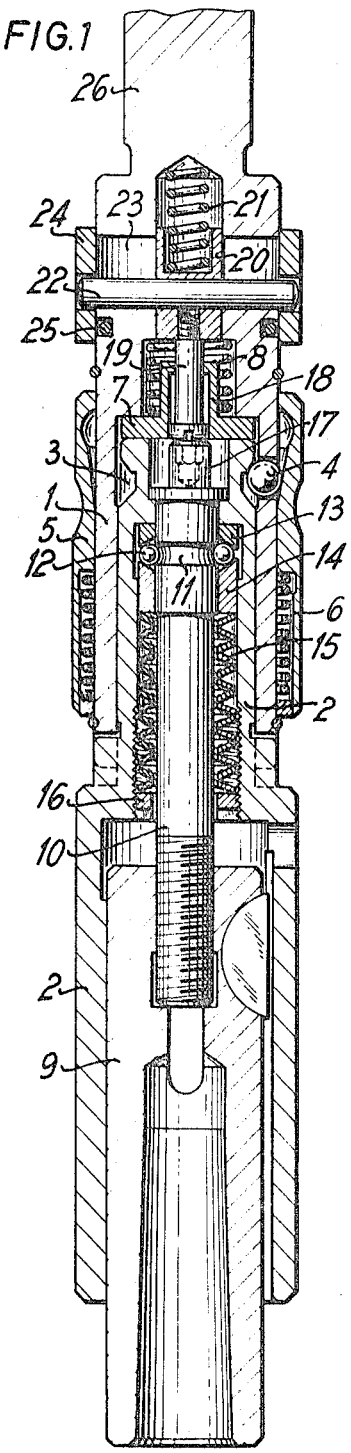

United States Patent

Bilz

[15] 3,652,099
[45] Mar. 28, 1972

[54] DRILL CHUCK

[72] Inventor: Otto Bilz, Waldackerweg 8, Esslingen/Neckar, West, Germany

[22] Filed: Feb. 19, 1970

[21] Appl. No.: 12,633

[52] U.S. Cl. ............................ 279/1 B, 250/106 R, 279/24, 279/75, 408/16, 408/710
[51] Int. Cl. ........................................................ B23b 31/08
[58] Field of Search ................ 279/1, 1 B, 1 ME, 22, 23, 24, 279/75; 250/106 R; 408/8, 10, 11, 16, 710

[56] References Cited

UNITED STATES PATENTS

| | | | |
|---|---|---|---|
| 3,381,550 | 5/1968 | Smith | 250/106 X |
| 3,552,147 | 1/1971 | Johansson et al. | 279/24 X |
| 2,775,137 | 12/1956 | Chung | 279/22 UX |
| 3,065,011 | 11/1962 | De Pew | 279/75 UX |

Primary Examiner—Andrew R. Juhasz
Assistant Examiner—James F. Coan
Attorney—Craig, Antonelli & Hill

[57] ABSTRACT

A drill chuck in which, when the pressure upon the drill exceeds an adjustable limit during a drilling operation, the drill holding means, for example, a tool socket, is released and moved axially in the direction toward the shank of the chuck so that the drill is relieved from pressure. Such a release of the tool socket or the like and its resulting movement is indicated on the outer slide of the chuck and may also actuate a switch to stop the machine tool.

11 Claims, 2 Drawing Figures

PATENTED MAR 28 1972 3,652,099

INVENTOR
Otto BILZ

BY
Craig, Antonelli, Stewart & Hill
Attorneys

DRILL CHUCK

The present invention relates to a drill chuck, and preferably to one of the type as disclosed in my prior U.S. Pat. No. 3,473,815, and it is the principal object of this invention to provide such a drill chuck with a mechanism which permits the tool socket or other tool-holding device to retract when during a drilling operation the back pressure which is exerted upon the drill in this socket exceeds a certain adjustable limit, and which also indicates when such a retracting movement is taking place.

For attaining this object, the invention provides that the chuck unit comprises an outer socket which is either directly secured to the mounting shank of the unit or is preferably removably secured thereto by a quick-change device, and in which the tool socket or other tool-holding device is axially slidable but nonrotatable and secured to the front end of a release rod which is axially slidable within the outer socket and the rear end of which is provided with a peripheral groove into which normally a plurality of locking balls partly project from an annular gap between an inner shoulder of the outer socket or a fixed stop ring in this socket and a pressure ring which surrounds the release rod and is slidable longitudinally within the outer socket against the pressure of an adjustable release spring. The other end of this release spring which preferably consists of a set of cup springs is supported on a bearing ring which is screwed into the outer socket and is adapted to be turned for varying the pressure of this spring.

Another feature of the invention consists in the provision of suitable means for indicating optically and/or acoustically and/or electrically when by an excessive pressure upon the drill the release rod is shifted toward the rear and the locking balls are thereby expelled from the annular groove in the release rod against the action of the release spring into the annular gap between the fixed stop ring and the movable pressure ring. These indicating means may, for example, act upon a switch which stops the further operation of the machine. The rear end of the release rod may, for example, act directly or indirectly upon a pin which is longitudinally slidable against the action of a return spring and is connected, for example, by a transverse pin, to an indicating ring which is slidable along the outer surface of the shank of the chuck unit. By its changed position on this shank, the mentioned indicating ring indicates when the release rod has been released from the locking balls and been moved toward the rear, and when it reaches this position, it may additionally act upon a switch for stopping the machine. When moving to this position, the indicating ring may also uncover an annular groove in the shaft which may be, for example, of a noticeable color or contain a radioactive substance which may act upon a suitable control mechanism.

The drill chuck according to the invention is therefore designed so as to insure by very simple means that, when the pressure upon the drill exceeds a certain adjustable limit, the tool socket or other tool-holding device will be automatically released so as to yield toward the rear and that this rearward movement will be indicated to the operator of the machine or may automatically cause the machine to be stopped. The present invention is of considerable importance because the longer a drill is used the duller it becomes and the more the drill pressure increases. In order to insure that the drilling operations will always occur properly, it is therefore necessary to indicate when the drill pressure exceeds a certain limit and then to relieve the drill from such pressure to save it from being damaged. This limit which may be admissible in any particular case may be easily varied by very simple adjusting means.

It is another important advantage of the invention that the external dimensions of the drill chuck do not have to be increased by the provision of the releasing means and that the releasing functions always occur properly and automatically. The release mechanism may also be installed without difficulty in any kind of drill holders other than those described herein.

Figure 2:
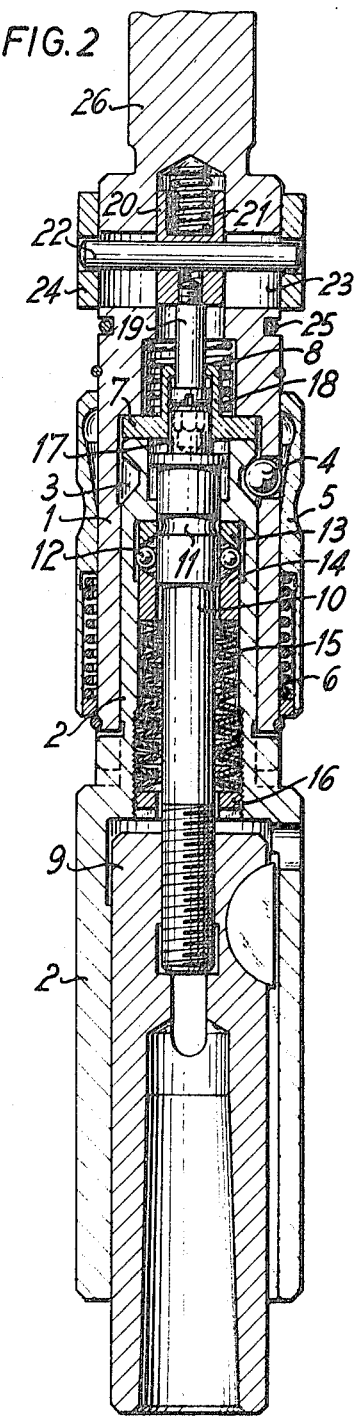

The features and advantages of the present invention will become more clearly apparent from the following detailed description thereof which is to be read with reference to the accompanying drawings, in which:

FIG. 1 shows a longitudinal section of a quick-change drill chuck according to the invention in its normal position during a drilling operation; while FIG. 2 shows a longitudinal section of the same drill chuck in the position after the highest admissible drill pressure has been exceeded and the tool socket has been released to relieve this pressure.

The quick-change drill chuck as illustrated in the drawings comprises a cylindrical housing 1 which is integrally secured at one end to a shank 26, while into its other end the rear part of an outer socket member 2 is inserted. Near its rear end, this socket member 2 is provided with an annular groove 3 into which a plurality of locking balls 4 engage which are slidable in radial bores in housing 1. A quick-change control sleeve 5 which is slidable forwardly along the outer surface of housing 1 against the action of a spring 6 normally maintains the balls 4 in engagement between the radial bores in housing 1 and the annular groove 3 in the socket member 2. Suitable means, not shown, also prevent the socket member 2 from turning relative to housing 1 but permit the rear part of this member 2 to slide longitudinally out of the housing 1 when the control sleeve 5 is shifted forwardly and the locking balls 4 are released from the annular groove 4 into the control sleeve so that the outer socket member 2 together with the elements therein including the tool socket 9 may then be quickly withdrawn as a unit from housing 1. At the rear end of the socket member 2 the housing 1 further contains a stop ring 7 which is acted upon by a spring 8.

The tool socket 9 in which a drill is to be mounted is axially slidable in the cylindrical outer or front part of the outer socket member 2 but it is prevented from rotating relative thereto, for example, by a spline which is slidable in a longitudinal groove in the inner wall of this front part of the outer socket member 2. Since the tool socket 9 is nonrotatable relative to the outer socket member 2 and the latter is also nonrotatable relative to housing 1 and the shank 26 on this housing, a rotation of shank 26 is transmitted to the tool socket 9.

The quick-change chuck as above described is provided with a release rod 10 which is screwed into the rear end of the tool socket 9 and located within the rear inner part of the outer socket member 2. Near its rear end this rod 10 is provided with a peripheral groove 11 into which normally a series of locking balls 12 partly engage by projecting from an annular gap between a stop ring 13 and a pressure ring 14. The stop ring 13 is mounted in a fixed position in the rear part of the outer socket member 2 by abutting against a shoulder therein. Ring 13 may also be omitted and balls 12 may engage directly against this shoulder.

The front-end surface of the pressure ring 14 engages upon a retracting spring 15 which may consist, for example, of a set of cup springs. The other end of spring 15 abuts against a bearing ring 16 which surrounds the release rod 10 and is screwed into the outer socket 2. The pressure which is exerted by spring 15 upon the locking balls 12 may therefore be adjusted by screwing the ring 16 in one or the other direction.

When carrying out a drilling operation, the drill which is inserted into the tool socket 9 exerts a pressure upon the release rod 10 and thus also upon the locking balls 12. These balls 12, in turn, are compressed between the stop ring 13 and the pressure ring 14 which is acted upon by the pressure of the release spring 15. If the pressure which is exerted upon the drill during a drilling operation exceeds the adjusted back pressure of the release spring 15, balls 12 will be forced radially out of groove 11 in rod 10 and entirely into the annular gap between rings 13 and 14 which is then enlarged since balls 12 will then shift the pressure ring 14 forwardly against the smaller pressure of spring 15.

However, as soon as balls 12 have been forced out of the annular groove 11 in rod 10, the latter and thus also the tool socket 9 move axially toward the rear under the pressure which is exerted upon the drill so that the drill will be relieved of this pressure. The highest admissible pressure which may be exerted upon the drill may be varied by an adjustment of the spring bearing ring 16. If therefore the drill becomes dull and the drill pressure increases more and more until it reaches a predetermined maximum, the drill will be retracted in its axial direction and relieved of further pressure.

The release and retraction of rod 10 may be indicated toward the outside. For this purpose, the reduced end 17 of rod 10 abuts against a connecting element 19 which, in turn, is connected to an axially movable pin 20. The connecting element 19 preferably consists of a screw which extends through the stop ring 7 and is slidable within and guided by a tubular extension 18 of ring 7.

Pin 20 which is axially movable in housing 1 is acted upon by the pressure of a return spring 21 and it is further provided with a transverse bore into which a pin 22 is fitted which is guided by the opposite walls of a transverse slot 23 in housing 1 so as to be slidable within this slot in the axial direction of housing 1. The opposite ends of pin 22 which project from housing 1 are secured in an indicating ring or sleeve 24 which is slidable longitudinally along the outer surface of housing 1. If desired, the position of the indicating sleeve 24 relative to the release rod 10 may be made adjustable by a setscrew, as indicated in dotted lines at the rear end of rod 10.

When the drill pressure exceeds a predetermined limit and under this pressure upon the tool socket 9 and the release rid 10 the locking balls 12 are expelled from the annular groove 11 so that rod 10 can then slide toward the rear under the action of spring 15, pin 20 together with the indicating sleeve 24 will be equally shifted. Sleeve 24 therefore always indicates by its particular position whether or not the drill together with the release rod 10 have been released and retracted. When rod 10 has been released and is moving toward or arrives at its rear end position, the indicating sleeve 24 or the transverse pin 22 may also actuate a miniature switch or switch contacts which may cause the operation of the machine to be stopped and/or any other optical or acoustical indicating means to be actuated.

When moving to its retracted position, the indicating sleeve 24 may also uncover an indicating ring 25 which may be inserted into an annular recess in housing 1. This indicating ring 25 may be of any desired kind and be made, for example, of a noticeable color or be covered with a luminous paint. It may also contain radioactive substances which, when uncovered by the indicating sleeve 24, may actuate a suitable control instrument.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A drill chuck comprising a shank in which the front part of said shank forms a substantially cylindrical housing, a tool socket coaxial to said shank and adapted to hold a drill, means for connecting said tool socket to said shank so as to be axially slidable but nonrotatable relative to said shank, control means for normally maintaining said tool socket in a forwardly extended position relative to said shank and for releasing said tool socket so as to retract from said forward position when an excessive pressure is exerted upon the front end of said drill, said control means comprising a tubular member, a release rod having a front end connected to said tool socket and axially slidable with said socket in but nonrotatable relative to said tubular member, said release rod having a peripheral groove near its rear end, an annular stop member in and fixed to said tubular member near the rear end of said rod and surrounding the same, a pressure ring forwardly adjacent to said stop member and surrounding and axially slidable relative to said rod and separated by an annular gap from said stop member, a plurality of locking balls normally disposed in a locking position partly in said peripheral groove and partly in said annular gap, spring means acting upon the front end of said pressure ring and tending to press the same toward said stop member so as to reduce the width of said annular gap and thereby tending to maintain said locking balls partly in said peripheral groove, and means for adjusting the pressure of said spring means, whereby when a pressure exceeding the pressure of said spring means through said pressure ring upon said locking balls is exerted in the rearward direction upon said tool socket, said balls will be expelled entirely from said peripheral groove into sad annular gap and thereby permit said tool socket and said release rod to slide rearwardly so as to relieve said pressure upon said tool socket.

2. A drill chuck as defined in claim 1, in which said spring adjusting means comprise a ring adjustably screwed into said tubular member and engaging upon the front end of said spring means.

3. A drill chuck as defined in claim 1, further comprising means for indicating the occurrence of said retracting movement.

4. A drill chuck as defined in claim 3, in which when said locking balls are expelled from said peripheral groove in said rod and said rod is shifted toward the rear, it acts upon said indicating means so as to indicate the release and shifting movement of said rod.

5. A drill chuck as defined in claim 4, in which said indicating means comprise an indicating sleeve axially slidable along the outer wall surface of said housing, a pin slidable within said housing behind the rear end of said release rod and coaxially to said rod, spring means acting upon said pin and tending to maintain the same in engagement with the rear end of said release rod, said outer wall of said housing having an axially elongated aperture, and means movable within said aperture and connecting said pin to said indicating sleeve.

6. A drill chuck as defined in claim 5, in which said outer wall surface of said housing is provided with a peripheral groove, said last groove being covered by said indicating sleeve when said tool socket and said release rod are in said unreleased forward position and being exposed to the outside when said tool socket and release rod are in the rear released position, and indicating means in said last groove.

7. A drill chuck as defined in claim 2, in which the outer wall of said housing is provided with a plurality of radially extending apertures and the wall of said tubular member with a peripheral groove which is normally substantially in alignment with said radial apertures, and further comprising a plurality of second locking balls, each of said second balls being disposed in one of said radial apertures and normally partly engaging into said last peripheral groove, and a control sleeve surrounding the outer wall of said housing and slidable against spring action along said wall from one position, in which it maintains said second locking balls partly in said last peripheral groove, to another position in which said second locking balls are disengaged from said last peripheral groove so that said tubular member and all elements therein including said tool socket, said release rod, said spring means, said pressure ring and said first locking balls may be withdrawn as a unit from the front end of said housing.

8. A drill chuck as defined in claim 4, wherein said rod also serves for actuating a switch which controls the operation of the machine in which said drill chuck is employed.

9. A drill chuck as defined in claim 4, wherein said indicating means includes a switch for controlling signaling means.

10. A drill chuck as defined in claim 6, wherein said indicating means is a colored ring disposed in said last groove.

11. A drill chuck as defined in claim 6, wherein said indicating means is a radioactive material for actuating means responsive thereto.

* * * * *